(12) United States Patent
Ojo et al.

(10) Patent No.: US 10,052,619 B2
(45) Date of Patent: Aug. 21, 2018

(54) METHOD FOR MAKING MOLECULAR SIEVE SSZ-95

(71) Applicant: Chevron U.S.A. Inc., San Ramon, CA (US)

(72) Inventors: Adeola Florence Ojo, Pleasant Hill, CA (US); Yihua Zhang, Albany, CA (US); Guan-Dao Lei, Walnut Creek, CA (US); Stacey Ian Zones, San Francisco, CA (US)

(73) Assignee: Chevron U.S.A. Inc., San Ramon, CA (US)

( * ) Notice: Subject to any disclaimer, the term of this patent is extended or adjusted under 35 U.S.C. 154(b) by 0 days.

(21) Appl. No.: 15/438,295

(22) Filed: Feb. 21, 2017

(65) Prior Publication Data
US 2017/0157600 A1  Jun. 8, 2017

Related U.S. Application Data

(63) Continuation of application No. 14/283,302, filed on May 21, 2014, now Pat. No. 9,573,124.

(51) Int. Cl.
| | |
|---|---|
| *C01B 39/00* | (2006.01) |
| *B01J 29/74* | (2006.01) |
| *C01B 39/48* | (2006.01) |
| *C01B 39/06* | (2006.01) |
| *B01J 20/18* | (2006.01) |
| *B01J 20/28* | (2006.01) |
| *B01J 20/30* | (2006.01) |
| *B01J 35/10* | (2006.01) |
| *B01J 37/00* | (2006.01) |
| *B01J 37/08* | (2006.01) |
| *B01J 37/30* | (2006.01) |
| *B01J 37/02* | (2006.01) |
| *C10G 65/04* | (2006.01) |

(52) U.S. Cl.
CPC ............... *B01J 29/74* (2013.01); *B01J 20/18* (2013.01); *B01J 20/28061* (2013.01); *B01J 20/28071* (2013.01); *B01J 20/3057* (2013.01); *B01J 20/3078* (2013.01); *B01J 20/3085* (2013.01); *B01J 35/1019* (2013.01); *B01J 35/1038* (2013.01); *B01J 37/0018* (2013.01); *B01J 37/0207* (2013.01); *B01J 37/082* (2013.01); *B01J 37/30* (2013.01); *C01B 39/06* (2013.01); *C01B 39/48* (2013.01); *C10G 65/043* (2013.01); *B01J 2229/183* (2013.01); *B01J 2229/38* (2013.01); *B01J 2229/40* (2013.01); *C01P 2006/12* (2013.01); *C01P 2006/14* (2013.01); *C10G 2300/70* (2013.01)

(58) Field of Classification Search
CPC ..... C01B 39/026; B01J 29/74; B01J 29/7046; B01J 29/7492; B01J 35/002; B01J 35/10; B01J 37/18; B01J 2229/186; B01J 2229/24; B01J 2229/40; B01J 2229/42
See application file for complete search history.

(56) References Cited

U.S. PATENT DOCUMENTS

| | | |
|---|---|---|
| 5,053,373 A | 10/1991 | Zones |
| 5,252,527 A | 10/1993 | Zones |
| 9,573,124 B2 * | 2/2017 | Ojo .......................... B01J 29/74 |
| 2009/0176643 A1 | 7/2009 | Elia et al. |
| 2011/0042267 A1 | 2/2011 | Hayasaka |
| 2012/0114552 A1 | 5/2012 | Zones |
| 2012/0114553 A1 | 5/2012 | Zones |

FOREIGN PATENT DOCUMENTS

| | | |
|---|---|---|
| WO | 2005042144 | 5/2001 |

* cited by examiner

*Primary Examiner* — David M Brunsman
(74) *Attorney, Agent, or Firm* — Mark L. Warzel

(57) ABSTRACT

A new crystalline molecular sieve designated SSZ-95 is disclosed. In general, SSZ-95 is synthesized from a reaction mixture suitable for synthesizing MTT-type molecular sieves and maintaining the mixture under crystallization conditions sufficient to form product. The product molecular sieve is subjected to a pre-calcination step, and ion-exchange to remove extra-framework cations, and a post-calcination step. The molecular sieve has a MTT-type framework and a H-D exchangeable acid site density of 0 to 50% relative to molecular sieve SSZ-32.

19 Claims, No Drawings

METHOD FOR MAKING MOLECULAR SIEVE SSZ-95

CROSS-REFERENCE TO RELATED APPLICATIONS

This application is a continuation of U.S. patent application Ser. No. 14/283,302, filed May 21, 2014, now U.S. Pat. No. 9,573,124, issued Feb. 21, 2017. The entire contents of application Ser. No. 14/283,302 are incorporated herein by reference.

TECHNICAL FIELD

The present disclosure relates to new crystalline molecular sieve SSZ-95, a method for preparing SSZ-95, and uses for SSZ-95.

BACKGROUND

Because of their unique sieving characteristics, as well as their catalytic properties, crystalline molecular sieves and zeolites are especially useful in applications such as hydrocarbon conversion, gas drying and separation. Although many different crystalline molecular sieves have been disclosed, there is a continuing need for new molecular sieves with desirable properties for gas separation and drying, hydrocarbon and chemical conversions, and other applications. New molecular sieves may contain novel internal pore architectures and acid site properties, providing enhanced selectivities and activities in these processes.

Molecular sieves are classified by the Structure Commission of the International Zeolite Association according to the rules of the IUPAC Commission on Zeolite Nomenclature. According to this classification, framework type zeolites and other crystalline microporous molecular sieves, for which a structure has been established, are assigned a three letter code and are described in the "Atlas of Zeolite Framework Types" Sixth Revised Edition, Elsevier (2007).

Molecular sieves are periodically ordered in three dimensions. Structurally disordered structures show periodic ordering in dimensions less than three (i.e., in two, one or zero dimensions). This phenomenon is characterized as stacking disorder of structurally invariant Periodic Building Units (PerBuU). Crystal structures built from Periodic Building Units are called end-member structures if periodic ordering is achieved in all three dimensions. Disordered structures are those where the stacking sequence of the Periodic Building Units deviates from periodic ordering up to statistic stacking sequences.

Molecular sieves having a MTT-type framework code have a one-dimensional 10-ring pore system. MTT-type molecular sieves have very similar, but not identical, X-ray diffraction patterns. SSZ-32 and its small crystal variant, SSZ-32x, are known MTT-type molecular sieves.

SSZ-32x, in comparison with standard SSZ-32, has broadened X-ray diffraction peaks that may be a result of its inherent small crystals, altered Argon adsorption ratios, increased external surface area and reduced cracking activity over other intermediate pore size molecular sieves used for a variety of catalytic processes. SSZ-32x and methods for making it are disclosed in U.S. Pat. Nos. 7,390,763, 7,569,507 and 8,545,805.

Known methods for making SSZ-32 and SSZ-32x employ high temperature calcination steps before the ion-exchange step for the purpose of removing extra framework cations. For Example, in Example 2 of U.S. Pat. No. 8,545,805, the as-made SSZ-32x product was calcined at 595° C. prior to undergoing ammonium ion-exchange. Likewise, in Example 2 of U.S. Pat. No. 7,390,763, the as-made SSZ-32x produce was calcined at 1100° F. (593° C.) prior to undergoing ammonium ion-exchange.

However, it has now been found that by using the manufacturing method described herein below, a novel molecular sieve designated herein as SSZ-95 is achieved. SSZ-95 is characterized as having a unique acid site density which causes the molecular sieve to exhibit enhanced selectivity, and less gas-make (e.g. production of $C_1$-$C_4$ gases), compared to conventional SSZ-32x materials.

SUMMARY

The present disclosure is directed to a family of crystalline molecular sieves with unique properties and a MTT-type topology, referred to herein as "molecular sieve SSZ-95" or simply "SSZ-95."

In one aspect, there is provided molecular sieve SSZ-95 characterized as having:
(a) a mole ratio of 20 to 70 of silicon oxide to aluminum oxide,
(b) a total micropore volume of between 0.005 and 0.02 cc/g; and
(c) a H-D exchangeable acid site density of up to 50% relative to SSZ-32.

In yet another aspect, there is provided a process for preparing SSZ-95 by:
(a) providing as-made, structure directing agent-containing molecular sieve SSZ-32x having a silicon-to-alumina ratio of 20 to 70;
(b) subjecting the molecular sieve to a pre-calcination step at a temperature below the full decomposition temperature of the structure directing agent, for a time sufficient to convert at least a portion of the structure directing agent to a decomposition residue;
(c) ion-exchanging the pre-calcined molecular sieve to remove extra-framework cations; and
(d) subjecting the molecular sieve to a post-calcination step at a temperature below the full decomposition temperature of the structure directing agent, for a time sufficient to convert at least a portion of the structure directing agent to a decomposition residue;
wherein the post-calcined molecular sieve has a cumulative weight loss (CWL) of 0<CWL≤10 wt. % and a total micropore volume of between 0.005 and 0.02 cc/g.

DETAILED DESCRIPTION

Introduction

The following terms will be used throughout the specification and will have the following meanings unless otherwise indicated.

The term "active source" means a reagent or precursor material capable of supplying at least one element in a form that can react and which can be incorporated into the molecular sieve structure. The terms "source" and "active source" can be used interchangeably herein.

The term "molecular sieve" and "zeolite" are synonymous and include (a) intermediate and (b) final or target molecular sieves and zeolites produced by (1) direct synthesis or (2) post-crystallization treatment (secondary modification). Secondary synthesis techniques allow for the synthesis of a target material from an intermediate material by heteroatom lattice substitution or other techniques. For example, an aluminosilicate can be synthesized from an intermediate borosilicate by post-crystallization heteroatom lattice substitution of the Al for B. Such techniques are known, for example as described in U.S. Pat. No. 6,790,433 to C. Y. Chen and Stacey Zones, issued Sep. 14, 2004.

The term "MTT molecular sieve" includes all molecular sieves and their isotypes that have been assigned the International Zeolite Associate framework code MTT, as described in the *Atlas of Zeolite Framework Types*, eds. Ch. Baerlocher, L. B. McCusker and D. H. Olson, Elsevier, 6th revised edition, 2007.

The term "SSZ-32x" refers to a molecular sieve characterized as having (a) a silica-to-alumina ratio of 20 to 70, (b) small, broad lathe-like crystallites in the range of less than 1,000 Angstroms, typically 200-400 Angstroms, and (c) an Argon adsorption ratio of between 0.55 and 0.70. The Argon adsorption ratio (ArAR) is calculated as follows:

$$ArAR = \frac{Ar \text{ adsorption at 87K between the relative pressures of 0.001 and 0.1}}{\text{total } Ar \text{ adsorption up to relative pressure of 0.1}}$$

The term "relative to SSZ-32" means as compared to SSZ-32 material made per the teachings of Example 1 of U.S. Pat. No. 5,252,527 to Zones, calcined per the teachings of Example 8 of that patent.

The term "pre-calcination" and its past tense form "pre-calcined" refer to the step of calcining a molecular sieve prior to the sieve undergoing an ion-exchange step to remove extra framework cations.

The term "post-calcination" and its past tense form "post-calcined" refer to the step of calcining a molecular sieve after to the sieve has undergone an ion-exchange step to remove extra framework cations.

It will be understood by a person skilled in the art that the MTT-type molecular sieve materials made according to the process described herein may contain impurities, such as amorphous materials.

The term "full decomposition temperature" refers to the minimum temperature, as identified by thermogravimetric analysis, indicating the onset and the end of organic template decomposition.

The term "Periodic Table" refers to the version of IUPAC Periodic Table of the Elements dated Jun. 22, 2007, and the numbering scheme for the Periodic Table Groups is as described in *Chem. Eng. News*, 63(5), 26-27 (1985).

For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained. It is noted that, as used in this specification and the appended claims, the singular forms "a," "an," and "the," include plural references unless expressly and unequivocally limited to one referent. As used herein, the term "include" and its grammatical variants are intended to be non-limiting, such that recitation of items in a list is not to the exclusion of other like items that can be substituted or added to the listed items. As used herein, the term "comprising" means including elements or steps that are identified following that term, but any such elements or steps are not exhaustive, and an embodiment can include other elements or steps.

Unless otherwise specified, the recitation of a genus of elements, materials or other components, from which an individual component or mixture of components can be selected, is intended to include all possible sub-generic combinations of the listed components and mixtures thereof.

The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. To an extent not inconsistent herewith, all citations referred to herein are hereby incorporated by reference.

All numerical ranges stated herein are inclusive of the lower and upper values stated for the range, unless stated otherwise.

Properties for materials described herein, where reported, are determined as follows:

(a) $SiO_2/Al_2O_3$ Ratio (SAR): determined by ICP elemental analysis. A SAR of infinity ($\infty$) represents the case where there is no aluminum in the zeolite, i.e., the mole ratio of silica to alumina is infinity. In that case the molecular sieve is comprised of essentially all of silica.

(b) Surface area: determined by $N_2$ adsorption at its boiling temperature. BET surface area is calculated by the 5-point method between $P/P_0$ of 0.05 and 0.2. Samples are first pre-treated at 400° C. for up to 24 hours in the presence of flowing, dry $N_2$ so as to eliminate any adsorbed volatiles like water or organics.

(c) Micropore volume: determined by $N_2$ adsorption at its boiling temperature. Micropore volume is calculated by the t-plot method between $P/P_0$ of 0.015 and 0.40. Samples are first pre-treated at 400° C. for up to 24 hours in the presence of flowing dry $N_2$ so as to eliminate any adsorbed volatiles like water or organics.

(d) Pour point: temperature at which an oil will begin to flow under controlled conditions, as determined by ASTM D5950-12a.

(e) API gravity: the gravity of a petroleum feedstock/product relative to water, as determined by ASTM D4052-11.

(f) Viscosity index (VI): an empirical, unit-less number indicated the effect of temperature change on the kinematic viscosity of the oil. The higher the VI of a base oil, the lower its tendency to change viscosity with temperature. Determined by ASTM 2270-04.

(g) Acid site distribution: Acid sites distribution determined by H-D exchange FTIR adapted from the published description by E. J. M Hensen, D. G. Poduval, D. A. J Michel Ligthart, J. A. Rob van Veen, M. S. Rigutto, J. Phys. Chem. C. 114, 8363-8374 2010.

Preparation of SSZ-95

As will be described herein below, SSZ-95 is prepared by:

(a) providing as-made, structure directing agent-containing molecular sieve SSZ-32x having a silicon-to-alumina ratio of 20 to 70;

(b) subjecting the molecular sieve to a pre-calcination step at a temperature below the full decomposition temperature of the structure directing agent, for a time sufficient to convert at least a portion of the structure directing agent to a decomposition residue;

(c) ion-exchanging the pre-calcined molecular sieve to remove extra-framework cations; and (d) subjecting the molecular sieve to a post-calcination step at a temperature below the full decomposition temperature of the structure directing agent, for a time sufficient to convert at least a portion of the structure directing agent to a decomposition residue;

wherein the post-calcined molecular sieve has a cumulative weight loss (CWL) of 0<CWL≤10 wt. % and a total micropore volume of between 0.005 and 0.02.

In general, SSZ-32x is synthesized from a reaction mixture suitable for synthesizing the MTT-type molecular sieve. Methods for synthesizing MTT-type molecular sieves, including SSZ-32 and SSZ-32x, are described in U.S. Pat. Nos. 5,053,373; 5,252,527; 5,397,454; 5,707,601; 5,785,947; 6,099,820; 7,157,075; 7,390,763; 7,468,126; 7,569,507; 7,682,600; 7,824,658; and 8,545,805.

The as-made, structure directing agent-containing aluminosilicate SSZ-32x is subjected to a "pre-calcination" step, as defined herein above. The pre-calcination step can be performed at atmospheric pressure or under vacuum, in the presence of oxygen (air) or in an inert atmosphere. The temperature(s) selected for the pre-calcination step should be less than the full decomposition temperature of the organic structure directing agent (e.g. as determined by TGA), and well below a temperature which, for the pre-calcination temperature and time period selected, would result in the complete removal of all of the organic material.

Following the pre-calcination step, the molecular sieve is characterized as follows: (a) a micropore volume of between 0.002 and 0.015 cc/g; (b) an external surface area of between 215 and 250 m$^2$/g; and (c) a BET surface area of between 240 and 280 m$^2$/g. In one subembodiment, the micropore volume is between 0.005 and 0.014 cc/g. In another subembodiment, the micropore volume is between 0.006 and 0.013 cc/g.

Following the pre-calcination step, the molecular sieve will undergo an ion-exchange step to remove the Group 1 and/or 2 extra-framework cations (e.g. K$^+$) and replace them with hydrogen, ammonium, or any desired metal-ion.

Following the ion-exchange step, the ion-exchanged molecular sieve is subjected to a "post-calcination" step (as defined herein above) at one or more temperatures between 95 and 500° C. for between 1 and 16 hours. In one embodiment, the crystals are post-calcined at one or more temperatures between 120 and 490° C. for between 1 and 6 hours. The post-calcination step can be performed at atmospheric pressure or under vacuum, in the presence of oxygen (air) or in an inert atmosphere.

The cumulative weight loss (CWL) during the pre- and post-calcination steps should be greater than zero and less than or equal to 10 wt. % (0<CWL≤10 wt. %). In one subembodiment, the CWL will be between 4 and 9 wt. %. In another subembodiment, the CWL is between 5 and 8.5 wt. %.

Following the post-calcination step, the molecular sieve is characterized as follows: (a) a total micropore volume of between 0.005 and 0.02 cc/g; (b) an external surface area of between 200 and 250 m$^2$/g; and (c) a BET surface area of between 240 and 280 m$^2$/g. In one subembodiment, the total micropore volume is between 0.008 and 0.018 cc/g. In another subembodiment, the total micropore volume is between 0.008 and 0.015 cc/g.

The temperature profile (e.g. the heating and cooling rates) for the pre- and post-calcination steps will depend somewhat on the calcination equipment employed. For example, in a commercial zeolite production facility, belt calciners with the capability of subjecting the zeolite to multiple temperatures are often employed to calcine zeolites. Commercial belt calciners may employ multiple and independent calcination zones, allowing the sieve product to be subjected to multiple temperatures as the material travels through the oven. One skilled in the art can readily select the belt speed and oven temperature(s) in order to calcine the SSZ-95 product to yield crystals that contain the target decomposition residue concentration with desired micropore volume.

The method of the present invention leaves a decomposition residue on the SSZ-95 zeolite crystals following the post-calcination step. While not wishing to be bound by any particular theory, it is believed that the decomposition residue selectively impacts the ion-exchangeable sites thereby resulting in a more preferred acid site density and acid site location, to yield a finished hydroisomerization catalyst having a unique acid site density that exhibits a greater degree of isomerization selectivity and less gas make (i.e. production of $C_1$-$C_4$ gases) than conventional catalysts containing known MTT-type materials.

The molecular sieve made from the process disclosed herein can be formed into a wide variety of physical shapes. Generally speaking, the molecular sieve can be in the form of a powder, a granule, or a molded product, such as extrudate having a particle size sufficient to pass through a 2-mesh (Tyler) screen and be retained on a 400-mesh (Tyler) screen. In cases where the catalyst is molded, such as by extrusion with an organic binder, the molecular sieve can be extruded before drying, or, dried or partially dried and then extruded.

The molecular sieve can be composited with other materials resistant to the temperatures and other conditions employed in organic conversion processes. Such matrix materials include active and inactive materials and synthetic or naturally occurring zeolites as well as inorganic materials such as alumina, clays, silica and metal oxides. Examples of such materials and the manner in which they can be used are disclosed in U.S. Pat. Nos. 4,910,006 and 5,316,753.

The extrudate or particle may then be further loaded using a technique such as impregnation, with one or more active metals selected from the group consisting of metals from Groups 8 to 10 of the Periodic Table, to enhance the hydrogenation function. It may be desirable to co-impregnate a modifying metal and one or more Group 8 to 10 metals at once, as disclosed in U.S. Pat. No. 4,094,821. In one embodiment, the at least one active metal is selected from the group consisting of nickel, platinum, palladium, and combinations thereof. After metal loading, the metal loaded extrudate can be calcined in air or inert gas at temperatures from 200° C. to 500° C. In one embodiment, the metal loaded extrudate is calcined in air or inert gas at temperatures from 390° C. to 482° C.

SSZ-95 is useful as catalysts for a variety of hydrocarbon conversion reactions such as hydrocracking, dewaxing, olefin isomerization, alkylation of aromatic compounds and the like. SSZ-95 is also useful as an adsorbent for separations.

Characterization of Molecular Sieve SSZ-95

Molecular sieve SSZ-95 made by the process disclosed herein is characterized as having:

(a) a mole ratio of 20 to 70 of silicon oxide to aluminum oxide, (b) a total micropore volume of between 0.005 and 0.02 cc/g; and (c) a H-D exchangeable acid site density of up to 50% relative to SSZ-32.

In one embodiment, SSZ-95 has a H-D exchangeable acid site density of 0.5 to 30% relative to SSZ-32. In another embodiment, SSZ-95 has a H-D exchangeable acid site density of between 2 and 25% relative to SSZ-32.

EXAMPLES

The following illustrative examples are intended to be non-limiting.

As-synthesized organic template-containing SSZ-32x used as the starting material for the preparation of all samples described in the following examples were prepared according to the method disclosed in U.S. Pat. No. 8,545,805 to Zones et al., granted on Oct. 1, 2013. The starting as-synthesized SSZ-32x was dried at a temperature of between 95° C. and 200° C., a temperature sufficient to dehydrate the product by removing all liquid water and water retained within the intercrystalline pores of the molecular sieve.

Effect of Pre-Calcining Temperature on Micropore Volume

In Examples 1 through 7 below, samples of SSZ-32x were pre-calcined at various temperatures between 200 and 400° C. prior to undergoing ammonium ion-exchange. In Comparative Example 7, SSZ-32x was pre-calcined at a conventional calcination temperature, namely 595° C. As will be shown below, by maintaining a lower pre-calcination temperature prior to the ammonium ion-exchange step (during the pre-calcination step), it was surprising to find the isomerization selectivity of the molecular sieve was enhanced as will be shown in Examples 8 through 13.

Example 1

3.38 g of as-synthesized SSZ-32x was pre-calcined in a muffle furnace under an atmosphere of dry air at a heating rate of 1° C./minute (min.) to 120° C. and held for 120 min., followed by a second ramp of 1° C./min. to 300° C. and held at this temperature for 180 min. Finally, the sample was cooled down to 150° C. The weight loss was 5.02 wt %.

The pre-calcined sample was then exchanged into the ammonium form as follows. An amount of ammonium nitrate equal to the mass of the sample to be exchanged was fully dissolved in an amount of deionized water ten times the mass of the sample. The sample was then added to the ammonium nitrate solution and the suspension was sealed in a flask and heated in an oven at 95° C. overnight. The flask was removed from the oven, and the sample was recovered immediately by filtration. This ammonium exchange procedure was repeated on the recovered sample, washed with copious amount of deionized water to a conductivity of less than 50 μS/cm and finally dried in an oven at 120° C. for three hours.

The ammonium-exchanged sample was calcined at 400° C., and then a micropore analysis was conducted. The sample had a micropore volume of 0.013 cc/g, external surface area of 232.9 m$^2$/g and a BET surface area of 267.3 m$^2$/g.

Example 2

4.24 g of as-synthesized SSZ-32x was pre-calcined in a muffle furnace under an atmosphere of dry air at a heating rate of 1° C./min. to 120° C. and held for 120 min. followed by a second ramp of 1° C./min. to 320° C. and held at this temperature for 180 min. Finally, the sample was cooled down to 150° C. The weight loss was 5.17 wt %. The pre-calcined sample was then exchanged into the ammonium form following the procedure described in Example 1. Sample was washed with copious amount of deionized water to a conductivity less than 50 μS/cm and finally dried in an oven at 120° C. for three hours.

The ammonium-exchanged sample was calcined at 400° C., and then a micropore analysis was conducted. The sample had a micropore volume of 0.0133 cc/g, external surface area of 237.1 m$^2$/g and BET surface area of 272.0 m$^2$/g.

Example 3

4.39 g of as-synthesized SSZ-32x was pre-calcined in a muffle furnace under an atmosphere of dry air at a heating rate of 1° C./min. to 120° C. and held for 120 min. followed by a second ramp of 1° C./min. to 350° C. and held at this temperature for 180 min. Finally, the sample was cooled down to 150° C. The weight loss was 5.72 wt %. The pre-calcined sample was then exchanged into the ammonium form following the procedure described in Example 1. Sample was washed with copious amount of deionized water to a conductivity less than 50 μS/cm and finally dried in an oven at 120° C. for three hours.

The ammonium-exchanged sample was calcined at 400° C., and then a micropore analysis was conducted. The sample had a micropore volume of 0.0135 cc/g, external surface area of 231.4 m$^2$/g and BET surface area of 266.6 m$^2$/g.

Example 4

4.41 g of as-synthesized SSZ-32x was pre-calcined in a muffle furnace under an atmosphere of dry air at a heating rate of 1° C./min. to 120° C. and held for 120 min. followed by a second ramp of 1° C./min. to 400° C. and held at this temperature for 180 min. Finally, the sample was cooled down to 150° C. The weight loss was 8.23 wt %. The pre-calcined sample was then exchanged into the ammonium form following the procedure described in Example 1. Sample was washed with copious amount of deionized water to a conductivity less than 50 μS/cm and finally dried in an oven at 120° C. for three hours.

The ammonium-exchanged sample was calcined at 400° C., and then a micropore analysis was conducted. The sample had a micropore volume of 0.0141 cc/g, external surface area of 229.8 m$^2$/g and BET surface area of 266.4 m$^2$/g.

Example 5

8.51 g of as-synthesized SSZ-32x was pre-calcined in a muffle furnace under an atmosphere of dry air at a heating rate of 1° C./min. to 120° C. and held for 120 min. followed by a second ramp of 1° C./min. to 200° C. and held at this temperature for 180 min. Finally, the sample was cooled down to 150° C. The weight loss was 4.36 wt %. The pre-calcined sample was then exchanged into the ammonium form following the procedure described in Example 1. Sample was washed with copious amount of deionized water to a conductivity less than 50 μS/cm and finally dried in an oven at 120° C. for three hours.

Example 6

A 9.09 g of as-synthesized SSZ-32x sample was pre-calcined in a muffle furnace under an atmosphere of dry air at a heating rate of 1° C./min. to 120° C. and held for 120 min. followed by a second ramp of 1° C./min. to 250° C. and held at this temperature for 180 min. Finally, the sample was cooled down to 150° C. The weight loss was 4.72 wt %. The pre-calcined sample was then exchanged into the ammonium form following the procedure described in Example 1. Sample was washed with copious amount of deionized water to a conductivity less than 50 µS/cm and finally dried in an oven at 120° C. for three hours.

Example 7 (Comparative)

The as-synthesized SSZ-32x sample was converted into the potassium form under an atmosphere of dry air at a heating rate of 1° C./min. to 120° C. and held for 120 min followed by a second ramp of 1° C./min. to 540° C. and held at this temperature for 180 min and lastly a third ramp of 1° C./min. to 595° C. and held at this temperature for 180 min. Finally, the sample was cooled down to 120° C. The total weight loss was 12.23 wt % (may contain some residual water). The calcined sample was then exchanged into the ammonium form following the procedure described in Example 1. Sample was washed with copious amount of deionized water to a conductivity less than 50 µS/cm and finally dried in an oven at 120° C. for three hours.

The ammonium-exchanged sample above was calcined at 400° C., and then a micropore analysis was conducted. The sample had a micropore volume of 0.0414 cc/g, external surface area of 235.9 m$^2$/g and BET surface area of 330.8 m$^2$/g.

Effect of Pre-Calcining Temperature on Isomerization Selectivity Using Palladium-Containing Catalyst Example 8

Palladium ion-exchange was carried out on the ammonium-exchanged sample from Example 1 using palladiumtetraamine dinitrate (0.5 wt % Pd). This palladium-exchanged sample was dried at 95° C. and then calcined in air at 482° C. for 3 hours to convert the palladiumtetraamine dinitrate to palladium oxide.

0.5 g of this Pd-exchanged sample was loaded in the center of a 23 inch-long by 0.25 inch outside diameter stainless steel reactor tube with alundum loaded upstream of the catalyst for preheating the feed (total pressure of 1200 psig; down-flow hydrogen rate of 160 mL/min (when measured at 1 atmosphere pressure and 25° C.); down-flow liquid feed rate=1 mL/hour.). All materials were first reduced in flowing hydrogen at about 315° C. for 1 hour. Products were analyzed by on-line capillary gas chromatography (GC) once every thirty minutes. Raw data from the GC was collected by an automated data collection/processing system and hydrocarbon conversions were calculated from the raw data.

The catalyst was tested at about 260° C. initially to determine the temperature range for the next set of measurements. The overall temperature range will provide a wide range of hexadecane conversion with the maximum conversion just below and greater than 96%. At least five on-line GC injections were collected at each temperature. Conversion was defined as the amount of hexadecane reacted to produce other products (including iso-$C_{16}$). Yields were expressed as weight percent of products other than n-$C_{16}$ and included iso-$C_{16}$ isomers as a yield product. The results are shown in Table 1.

TABLE 1

| | |
|---|---|
| Pre-calcination Temperature (° C.) | 300 |
| Weight Loss after pre-calcination (wt. %) | 5.02 |
| Micropore Vol. (cc/g) | 0.013 |
| Ext. area (m$^2$/g) | 232.9 |
| BET area (m$^2$/g) | 267.3 |
| Isomerization Selectivity at 96% Conversion | 83% |
| Temperature at 96% Conversion (° F.) | 534 |
| $C_4$- Cracking (%) | 2.0 |

Example 9

Palladium ion-exchange was carried out on the ammonium-exchanged sample from Example 2 per the teachings of Example 8. The palladium-exchanged sample was tested for the selective hydroconversion of n-hexadecane under the conditions described in Example 8. The results are presented in Table 2.

The isomerization selectivity at 96% conversion for this sample is better than those produced by prior art and conventional methods for the conversion of the n-C16 feed to isomerized products, with lower gas make due to n-C16 cracking.

TABLE 2

| | |
|---|---|
| Pre-calcination Temperature (° C.) | 320 |
| Weight Loss after pre-calcination (wt. %) | 5.17 |
| Micropore Vol. (cc/g) | 0.0133 |
| Ext. area (m$^2$/g) | 237.1 |
| BET area (m$^2$/g) | 272.0 |
| Activation temperature (° C.) | 482 |
| Isomerization Selectivity at 96% Conversion | 83.2% |
| Temperature (° F.) | 532 |
| $C_4$- Cracking (%) | 1.90 |

Example 10

Palladium ion-exchange was carried out on the ammonium-exchanged sample from Example 3 per the teachings of Example 8. The palladium-exchanged sample was tested for the selective hydroconversion of n-hexadecane under the conditions described in Example 8. The results are shown in Table 3. The isomerization selectivity at 96% conversion for this sample is better than those produced by prior art and conventional methods for the conversion of the n-$C_{16}$ feed to isomerized products, with lower gas make due to n-$C_{16}$ cracking.

TABLE 3

| | |
|---|---|
| Pre-calcination Temperature (° C.) | 350 |
| Weight Loss after pre-calcination (wt. %) | 5.72 |
| Micropore Vol. (cc/g) | 0.0135 |
| Ext. area (m$^2$/g) | 231.4 |
| BET area (m$^2$/g) | 266.6 |
| Activation temperature (° C.) | 482 |
| Isomerization Selectivity at 96% Conversion | 84.4% |
| Temperature (° F.) | 532 |
| $C_4$- Cracking (%) | 1.80 |

Example 11

Palladium ion-exchange was carried out on the ammonium-exchanged sample from Example 4 per the teachings of Example 8. The palladium-exchanged sample was tested for the selective hydroconversion of n-hexadecane under the conditions described in Example 8. The results are presented in Table 4. The isomerization selectivity at 96% conversion for this sample is better than those produced by prior art and conventional methods for the conversion of the n-$C_{16}$ feed to isomerized products, with lower gas make due to n-$C_{16}$ cracking.

TABLE 4

| | |
|---|---|
| Pre-calcination Temperature (° C.) | 400 |
| Weight Loss after pre-calcination (wt. %) | 8.23% |
| Micropore Vol. (cc/g) | 0.0141 |
| Ext. area (m$^2$/g) | 229.8 |
| BET area (m$^2$/g) | 266.4 |
| Activation temperature (° C.) | 482 |
| Isomerization Selectivity at 96% Conversion | 83.4% |
| Temperature (° F.) | 531 |
| $C_4$- Cracking (%) | 2.05% |

Example 12

Palladium ion-exchange was carried out on the ammonium-exchanged sample from Example 5 per the teachings of Example 8. The palladium-exchanged sample was tested for the selective hydroconversion of n-hexadecane under the conditions described in Example 8. The results are presented in Table 5. The isomerization selectivity at 96% conversion for this sample is better than those produced by prior art and conventional methods for the conversion of the n-$C_{16}$ feed to isomerized products, with lower gas make due to n-$C_{16}$ cracking.

TABLE 5

| | |
|---|---|
| Pre-calcination Temperature (° C.) | 200 |
| Weight Loss after pre-calcination (wt. %) | 4.36% |
| Activation temperature (° C.) | 482 |
| Isomerization Selectivity at 96% Conversion | 83.6% |
| Temperature (° F.) | 532 |
| $C_4$- Cracking (%) | 1.9% |

Example 13

Palladium ion-exchange was carried out on the ammonium-exchanged sample from Example 6 per the teachings of Example 8. The palladium-exchanged sample was tested for the selective hydroconversion of n-hexadecane under the conditions described in Example 8. The results are presented in Table 6. The isomerization selectivity at 96% conversion for this sample is better than those produced by prior art and conventional methods for the conversion of the n-$C_{16}$ feed to isomerized products, with lower gas make due to n-$C_{16}$ cracking.

TABLE 6

| | |
|---|---|
| Pre-calcination Temperature (° C.) | 250 |
| Weight Loss after pre-calcination (wt. %) | 4.73 |
| Activation temperature (° C.) | 482 |
| Isomerization Selectivity at 96% Conversion | 83.6% |
| Temperature (° F.) | 532 |
| $C_4$- Cracking (%) | 1.9 |

Example 14 (Comparative)

Palladium ion-exchange was carried out on the ammonium-exchanged sample from Example 7 per the teachings of Example 8. The palladium-exchanged sample was tested for the selective hydroconversion of n-hexadecane under the conditions described in Example 8. The results are shown in Table 7. The isomerization selectivity at 96% conversion for this sample is inferior to those described by the present invention and presented in Examples 8 to 13, as indicated in Table 8.

TABLE 7

| | |
|---|---|
| Pre-calcination Temperature (° C.) | 595 |
| Weight Loss after pre-calcination (wt. %) | 12.23 |
| Micropore Vol. (cc/g) | 0.0414 |
| Ext. area (m$^2$/g) | 235.9 |
| BET area (m$^2$/g) | 330.8 |
| Activation temperature (° C.) | 482 |
| Isomerization Selectivity at 96% Conversion | 81.2% |
| Temperature (° F.) | 533 |
| $C_4$- Cracking (%) | 2.30 |

As shown in Table 8 below, by maintaining the pre-calcination temperature between 200 and 400° C., with a weight loss of below 10 wt. %, enhanced isomerization selectivity was achieved as compared to material that was subjected to conventional calcination temperatures. In addition, the samples were subjected to pre-calcination temperature between 200 and 400° C., the products exhibited a significantly lower micropore volume after ammonium exchange as compared to the sample prepared using a conventional, higher pre-calcination temperature (Comparative Example 14). The lower micropore volume is indicative of the presence of decomposition residue in the pores of the molecular sieve resulting in the preferred acid site density and location of these sites.

TABLE 8

| Example | Isomerization Selectivity at 96% Conversion | Pre-calcination Temperature (° C.) | Micropore Vol. (cc/g) | Weight Loss after pre-calcination (wt. %) |
|---|---|---|---|---|
| 8 | 83% | 300 | 0.0130 | 5.02 |
| 9 | 82.3% | 320 | 0.0133 | 5.17 |
| 10 | 84.4% | 350 | 0.0135 | 5.72 |
| 11 | 83.4% | 400 | 0.0141 | 8.23 |
| 12 | 83.6% | 200 | — | 4.36 |
| 13 | 83.6% | 250 | — | 4.73 |
| 14 (conventional) | 81.2% | 595* | 0.0414 | 12.23 |

*Temperature results in full calcination of the sample

Evaluation by Zeolite Acidity Measurements

Example 15

A 50 g of as-synthesized SSZ-32x was pre-calcined following the procedure described in Example 4. The pre-calcined sample was exchanged into the ammonium form following the teachings of Example 1. Next, the ammonium-exchanged material was post-calcined in a muffle furnace under an atmosphere of dry air at a heating rate of 1° C./min. to 120° C. and held for 180 min followed by a second ramp of 1° C./min. to 400° C. and held at this temperature for 180 min. The zeolite was then cooled to ambient temperature before acidity measurement by FTIR and micropore analysis. Prior to FTIR measurement, the sample was heated for 1 hour at 400-450° C. under vacuum <1×10$^{-5}$ Torr. After cooling down to 150° C., dosage of deuterated benzene was added until H-D exchange equilibrium was reached. Then FTIR was recorded in OD stretching region. Acidity was determined by the amount of bridged hydroxyl groups exchanged with deuterated benzene at 150° C. The sample had a micropore volume of 0.0132 cc/g, external surface area of 217.66 m²/g and BET surface area of 251.76 m²/g.

Example 16

A 50 g of as-synthesized SSZ-32x zeolite sample was exchanged into the ammonium form following the teachings of Example 1. Sample was washed with copious amount of deionized water to a conductivity less than 50 μS/cm and finally dried in an oven at 120° C. for three hours. Then the dried sample was post-calcined in a muffle furnace under an atmosphere of dry air at a heating rate of 1° C./min. to 120° C. and held for 180 min followed by a second ramp of 1° C./min. to 482° C. and held at this temperature for 180 min. The zeolite was then cooled to ambient temperature before acidity measurement by FTIR. Then, acidity was determined by the amount of bridged hydroxyl groups exchanged with deuterated benzene at 150° C. following the teachings of Example 15.

Example 17

A 50 g of as-synthesized SSZ-32x zeolite sample was pre-calcined and exchanged into the ammonium form following the procedure described in Example 3. Then the sample was post-calcined in a muffle furnace under an atmosphere of dry air at a heating rate of 1° C./min. to 120° C. and held for 180 min followed by a second ramp of 1° C./min. to 482° C. and held at this temperature for 180 min. The zeolite was then cooled to ambient temperature before acidity measurement by FTIR. Acidity was determined by the amount of bridged hydroxyl groups exchanged with deuterated benzene at 150° C. following the teachings of Example 15.

Example 18

A 50 g of as-synthesized SSZ-32x sample was pre-calcined and exchanged into the ammonium form following the procedure described in Example 4. Then the sample was post-calcined following the procedure described in Example 17. Acidity was determined by the amount of bridged hydroxyl groups exchanged with deuterated benzene at 150° C. The sample had a micropore volume of 0.0144 cc/g, external surface area of 231.78 m²/g and BET surface area of 268.21 m²/g.

Example 19

A 40 g of as-synthesized SSZ-32x sample was calcined in a muffle furnace under an atmosphere of dry air at a heating rate of 1° C./min. to 120° C. and held for 120 min followed by a second ramp of 1° C./min. to 450° C. and held at this temperature for 180 min. Finally, the sample was cooled down to 150° C. The calcined sample was then exchanged into the ammonium form following the procedure described in Example 1. Sample was washed with copious amount of deionized water to a conductivity less than 50 μS/cm and finally dried in an oven at 120° C. for three hours. Then the sample was post-calcined following the procedure described in Example 17. Acidity was determined by the amount of bridged hydroxyl groups exchanged with deuterated benzene at 150° C. following the teachings of Example 15.

Comparative Example 20

Example 20 was prepared using standard SSZ-32 zeolite, which was calcined at 600° C. prior to ammonium ion-exchange and dried only at 120° C. after ammonium ion-exchange. Acidity was determined by the amount of bridged hydroxyl groups exchanged with deuterated benzene at 150° C. following the teachings of Example 15.

Comparative Example 21

As-synthesized SSZ-32x sample was calcined at 595° C. prior to ammonium ion-exchange and dried only at 120° C. after ammonium ion-exchange following the procedure described in Example 7. Acidity was determined by the amount of bridged hydroxyl groups exchanged with deuterated benzene at 150° C. following the teachings of Example 15.

Catalyst Preparation and Evaluation

Example 22

A catalyst was prepared using zeolite from Example 15 according to the method disclosed in U.S. Pat. No. 7,468,126 B2 to Zones et al., granted on Dec. 23, 2008. The dried and calcined extrudate was impregnated with a solution containing platinum. The overall platinum loading was 0.325 wt. %.

Real Feed Performance Test Conditions

A feed "light neutral" (LN) was used to evaluate the invented catalysts. Properties of the feed are listed in the following Table 9.

TABLE 9

| API Gravity | 34 |
|---|---|
| N, ppm | <0.3 |
| S, ppm | 6 |
| VI | 120 |
| Vis@100° C. (cSt) | 3.92 |
| Vis@70° C. (cSt) | 7.31 |
| Wax (wt %) | 12.9 |
| Dewaxed oil properties | |
| DWO VI | 101 |
| DWO Vis@100° C. (cSt) | 4.08 |
| DWO Vis@40° C. (cSt) | 20.1 |
| SIMDIST TBP (wt %) (° F.) | |
| TBP @0.5 | 536 |
| TBP @5 | 639 |
| TBP @10 | 674 |
| TBP @30 | 735 |
| TBP @50 | 769 |
| TBP @70 | 801 |
| TBP @90 | 849 |
| TBP @95 | 871 |
| TBP @99.5 | 910 |

The reaction was performed in a micro unit equipped with two fix bed reactors. The run was operated under 2100 psig total pressure. Prior to the introduction of feed, the catalysts were activated by a standard reduction procedure. The LN feed was passed through the hydroisomerization reactor at a LHSV of 2 and then was hydrofinished in the 2nd reactor, which was loaded with a Pd/Pt catalyst to further improve the lube product quality. The hydrogen to oil ratio was about 3000 scfb. The lube product was separated from fuels through the distillation section. Pour point, cloud point, viscosity, viscosity index and simdist were collected on the products. The real feed test results are presented in Table 11.

Example 23

A catalyst was prepared using zeolite from Example 16 by following the procedure described in Example 22.

Example 24

A catalyst was prepared using zeolite from Example 17 by following the procedure described in Example 22.

Example 25

A catalyst was prepared using zeolite from Example 18 by following the procedure described in Example 22.

Example 26

A catalyst was prepared using zeolite from Example 19 by following the procedure described in Example 22.

Comparative Example 27

Example 27 was a dewaxing catalyst containing standard SSZ-32 zeolite from Example 20. A catalyst was prepared by following the procedure described in Example 22.

Comparative Example 28

Example 28 was a dewaxing catalyst containing standard SSZ-32X zeolite from Example 21. A catalyst was prepared by following the procedure described in Example 22.

Example 29

Table 10 shows the FTIR stretching results of the zeolite component (after exchange with deuterated benzene) in Examples 15-21 and Table 11 shows the lube dewaxing data for Examples 22-28.

According to FTIR results, Table 10 shows about 32% acid site density present in the zeolite component of Example 19 relative to Comparative Example 20. The acid site density was decreased from 13.4% to 11.1% when the pre-calcination temperature was decreased from 400° C. (Example 18) to 350° C. (Example 17). Examples 15 and 16, which produced the highest lube yield and with the best activity, (See Table 11) have the lowest acid site density: 3.1% and 5.9% respectively. This suggests the catalysts performance is inversely proportional to the amount of active acid sites in the zeolite component.

Compared to Comparative Example 27, all catalysts in this invention showed significantly improved lube yield, activity and VI as shown in Table 11. Examples 24 and 26 gained ~29° F. in activity when the yield was increased by 3.9 wt % and 2.1 wt % respectively. The VI was increased by 1.5 and 1.6 respectively. For Examples 22 and 23, both lube yield and activity were further improved to 4-4.4 wt % and 34° F. respectively.

TABLE 10

| Catalyst | Comparative Example 20 (SSZ-32) | Comparative Example 21 (SSZ-32x) | Example 15 | Example 16 | Example 17 | Example 18 | Example 19 |
|---|---|---|---|---|---|---|---|
| Pre-calcination temperature (° C.) | 600 | 595 | 400 | 120 | 350 | 400 | 450 |
| Post-calcination temperature (° C.) | 120 | 120 | 400 | 482 | 482 | 482 | 482 |
| Acid sites in zeolite determined by H-D exchange (relative to zeolite SSZ-32)* (%) | 100.0 | 55.7 | 3.1 | 5.9 | 11.1 | 13.4 | 31.9 |
| Micropore Vol. (cc/g) | 0.0601 | 0.029 | 0.0132 | — | — | 0.0144 | — |

*For FTIR measurement, the sample was heated for 1 hour at 400-450° C. under vacuum <1 × 10$^{-5}$ Torr

TABLE 11

| Catalyst | Comparative Example 27 (SSZ-32) | Comparative Example 28 (SSZ-32x) | Example 22 | Example 23 | Example 24 | Example 25 | Example 26 |
|---|---|---|---|---|---|---|---|
| CAT at pour point (−15° C.) | Base | −39.3 | −34.0 | −34.0 | −29.3 | — | −29.1 |
| Lube yield (wt. %) | Base | +1.1 | +4.0 | +4.4 | +3.9 | — | +2.1 |
| Gas (wt. %) | Base | −1.2 | −1.7 | −1.6 | −1.6 | — | −1.3 |
| Viscosity Index | Base | +0 | +3.2 | +1.5 | +1.5 | — | +1.6 |

What is claimed is:

1. A process for preparing SSZ-95, comprising:
   (a) providing molecular sieve SSZ-32x having a silicon-to-alumina ratio of 20 to 70, wherein the molecular sieve comprises a structure directing agent;
   (b) subjecting the molecular sieve to a pre-calcination step at a temperature between 200° C. and 400° C., for a time sufficient to convert a portion of the structure directing agent to a decomposition residue;
   (c) ion-exchanging the molecular sieve to remove extra-framework cations; and
   (d) subjecting the molecular sieve to a post-calcination step at a temperature below the full decomposition temperature of the structure directing agent, for a time sufficient to convert at least a portion of the structure directing agent to a decomposition residue;
   wherein the post-calcined molecular sieve has a cumulative weight loss (CWL) of 0<CWL≤10 wt. % and a total micropore volume of between 0.005 and 0.02 cc/g.

2. The process of claim 1, wherein the pre-calcined molecular sieve has a micropore volume of between 0.002 and 0.015 cc/g.

3. The process of claim 1, wherein the pre-calcined molecular sieve has an external surface area of between 215 and 250 m$^2$/g.

4. The process of claim 1, wherein the pre-calcined molecular sieve has a BET surface area of between 240 and 280 m$^2$/g.

5. The process of claim 1, wherein the post-calcined molecular sieve has a cumulative loss-on-ignition of between 4 and 9 wt. %.

6. The process of claim 1, wherein the post-calcined molecular sieve has a cumulative loss-on-ignition of between 5 and 8.5 wt. %.

7. The process of claim 1, wherein the post-calcined molecular sieve has a total micropore volume of between 0.008 and 0.018 cc/g.

8. The process of claim 7, wherein the post-calcined molecular sieve has a total micropore volume of between 0.008 and 0.015 cc/g.

9. The process of claim 1, wherein the post-calcined molecular sieve has an external surface area of between 200 and 250 m$^2$/g; and a BET surface area of between 240 and 280 m$^2$/g.

10. The process of claim 1, wherein during the post-calcination step, the molecular sieve is subjected to one or more temperatures between 120 and 490° C. for between 1 and 6 hours.

11. The process of claim 1, wherein the pre-calcined molecular sieve has a micropore volume of between 0.002 and 0.015 cc/g, and the post-calcined molecular sieve has a total micropore volume of between 0.008 and 0.02 cc/g.

12. The process of claim 1, further comprising the steps of: (1) impregnating the post-calcined molecular sieve with one or more active metals selected from the group consisting of metals from Groups 8 to 10 of the Periodic Table; and (2) calcining the impregnated molecular sieve at temperatures from 200° C. to 500° C.

13. The process of claim 12, wherein the impregnated molecular sieve is calcined at temperatures from 390° C. to 482° C.

14. The process of claim 1, wherein the post-calcined molecular sieve has a MTT-type framework, a mole ratio of 20 to 70 of silicon oxide to aluminum oxide, and a H-D exchangeable acid site density of up to 50% relative to SSZ-32.

15. The process of claim 14, wherein the post-calcined molecular sieve has a mole ratio of 20 to 50 of silicon oxide to aluminum oxide.

16. The process of claim 14, wherein the post-calcined molecular sieve has a total micropore volume of between 0.008 and 0.018 cc/g.

17. The process of claim 14, wherein the post-calcined molecular sieve has an external surface area of between 200 and 250 m$^2$/g; and a BET surface area of between 240 and 280 m$^2$/g.

18. The process of claim 14, wherein the post-calcined molecular sieve has a H-D exchangeable acid site density of 0.5 to 30% relative to molecular sieve SSZ-32.

19. The process of claim 14, wherein the post-calcined molecular sieve has a H-D exchangeable acid site density of 2 to 25% relative to molecular sieve SSZ-32.

* * * * *